(12) United States Patent
Kim et al.

(10) Patent No.: US 8,674,709 B2
(45) Date of Patent: Mar. 18, 2014

(54) CIRCUIT AND METHOD FOR MEASURING CAPACITANCE VALUE OF TOUCH SCREEN

(75) Inventors: Ji Hun Kim, Daejeon-si (KR); Hyun Min Song, Cheongju-si (KR); Joon Ho Na, Daejeon-si (KR); Ki Uk Gwak, Gwangju-si (KR); Sang Gug Lee, Daejeon-si (KR)

(73) Assignee: Silicon Works Co., Ltd., Daejeon-Si (KR)

( * ) Notice: Subject to any disclaimer, the term of this patent is extended or adjusted under 35 U.S.C. 154(b) by 363 days.

(21) Appl. No.: 13/106,411

(22) Filed: May 12, 2011

(65) Prior Publication Data

US 2011/0279131 A1 Nov. 17, 2011

(30) Foreign Application Priority Data

May 13, 2010 (KR) .................. 10-2010-0044814

(51) Int. Cl.
 *G01R 27/26* (2006.01)
(52) U.S. Cl.
 USPC ........... 324/679; 324/658; 324/659; 324/660; 324/661; 324/670; 324/680; 324/690; 324/548; 345/173; 345/174; 345/175; 345/176; 345/177; 345/178; 178/18.06; 178/19.03
(58) Field of Classification Search
 USPC .................. 324/658–690, 548; 345/173–178; 178/18.06, 19.03
 See application file for complete search history.

(56) References Cited

U.S. PATENT DOCUMENTS

| | | | | |
|---|---|---|---|---|
| 5,294,889 A * | 3/1994 | Heep et al. | ..................... | 324/678 |
| 6,151,080 A * | 11/2000 | Salle et al. | ..................... | 348/638 |
| 6,353,337 B2 * | 3/2002 | Nasu et al. | ....................... | 326/83 |
| 6,522,154 B2 * | 2/2003 | Fifield et al. | .................. | 324/678 |
| 6,795,359 B1 * | 9/2004 | Baker | .......................... | 365/209 |
| 7,123,029 B2 * | 10/2006 | Frey et al. | ...................... | 324/686 |
| 7,307,485 B1 * | 12/2007 | Snyder et al. | ................ | 331/150 |
| 7,504,833 B1 * | 3/2009 | Seguine | ......................... | 324/672 |
| 8,072,436 B2 * | 12/2011 | Eriguchi et al. | ............. | 345/173 |
| 8,262,875 B2 * | 9/2012 | Paulus et al. | .................. | 204/406 |
| 8,330,735 B2 * | 12/2012 | Lin et al. | ...................... | 345/173 |
| 8,363,033 B2 * | 1/2013 | Chen et al. | .................... | 345/174 |
| 2002/0130672 A1 * | 9/2002 | Fifield et al. | ................. | 324/678 |
| 2006/0290419 A1 * | 12/2006 | Kim et al. | ..................... | 327/552 |
| 2007/0139360 A1 * | 6/2007 | Yoon | ............................. | 345/156 |
| 2007/0194964 A1 * | 8/2007 | Chang et al. | ................. | 341/144 |
| 2008/0122457 A1 * | 5/2008 | Taguchi | ........................ | 324/679 |
| 2008/0191713 A1 * | 8/2008 | Hauer et al. | .................. | 324/658 |
| 2008/0203977 A1 * | 8/2008 | Raimar et al. | ................ | 320/166 |
| 2008/0252303 A1 * | 10/2008 | Kato et al. | .................... | 324/661 |

(Continued)

*Primary Examiner* — Patrick Assouad
*Assistant Examiner* — Lamarr Brown
(74) *Attorney, Agent, or Firm* — Kile Park Reed & Houtteman PLLC (57) ABSTRACT

A circuit for measuring a capacitance value of a touch screen includes: a target capacitor unit having a target capacitor charged with a target charging voltage; a target voltage control unit to charge the target capacitor; a reference capacitor unit having a reference capacitor charged with a charging reference voltage; a reference voltage control unit to charge the reference capacitor; a comparator to compare the target charging voltage and the charging reference voltage and output a transition signal at a moment when the target charging voltage becomes higher than the charging reference voltage; and a controller to receive an output signal of the comparator and a clock signal and generate a digital output signal and a control signal, wherein a capacitance value of the target capacitor is measured using a time elapsed from a time when the target capacitor is initialized to a time when the transition signal is outputted.

17 Claims, 5 Drawing Sheets

(56) References Cited

U.S. PATENT DOCUMENTS

| | | | |
|---|---|---|---|
| 2009/0102813 A1* | 4/2009 | Mamba et al. | 345/174 |
| 2011/0043466 A1* | 2/2011 | Kim et al. | 345/173 |
| 2011/0043467 A1* | 2/2011 | Kim et al. | 345/173 |
| 2011/0163768 A1* | 7/2011 | Kwon et al. | 324/686 |
| 2011/0279407 A1* | 11/2011 | Kim et al. | 345/174 |
| 2013/0082684 A1* | 4/2013 | Spalding, Jr. | 324/111 |

* cited by examiner

CIRCUIT AND METHOD FOR MEASURING CAPACITANCE VALUE OF TOUCH SCREEN

BACKGROUND OF THE INVENTION

1. Field of the Invention

The present invention relates to a technology for measuring a capacitance value of a touch screen, and more particularly, to a circuit and a method for measuring a capacitance value of a touch screen, which can linearly change a reference voltage of a comparator used for detecting a capacitance value, to improve a resolution, and can use subranging to shorten a time for measuring a capacitance value.

2. Description of the Related Art

Recently, touch screens are frequently used as a user interface device. Touch screens are divided into a resistive film type, a capacitance type, an infrared type and an ultrasonic type, depending upon a panel type. A touch screen of the capacitance type has advantages in terms of high transmittance, durability and price, and thus, is widely used in a mobile phone, a portable terminal such as a personal digital assistant (PDA), a monitor, and a variety of electric appliances. Hereafter, the touch screen of the capacitance type will be described.

A user can issue a desired command by touching an optional point on a touch screen display device using a stylus pen or a finger. To this end, the touch screen display device includes, in addition to a plurality of pixels for displaying an image, a plurality of touch sensing elements for sensing the point which is touched by the user.

A gate signal and a data signal are applied to each pixel, and each touch sensing element senses a touch made by the user and outputs a resultant sensing signal. To this end, the touch screen display device a gate driving unit and a data driving unit for applying the gate signal and the data signal, and a touch signal recognition circuit for recognizing a touching operation based on a change in the capacitance of a capacitor by the touch.

If the touch screen is touched by a body portion such as a finger or a stylus pen, capacitance of a capacitor for sensing a touch (hereinafter, referred to as a "target capacitor") changes depending upon an intensity of the touch. For example, as an intensity of a touch is great, capacitance increases. At this time, because a capacitance change is fine to several pF to several tens pF and parasitic capacitance on a touch screen pad is larger than several tens pF, a capacitance variation becomes relatively small. Thus, in order to obtain a high resolution, a clock signal with a high frequency is required.

Figure 1:
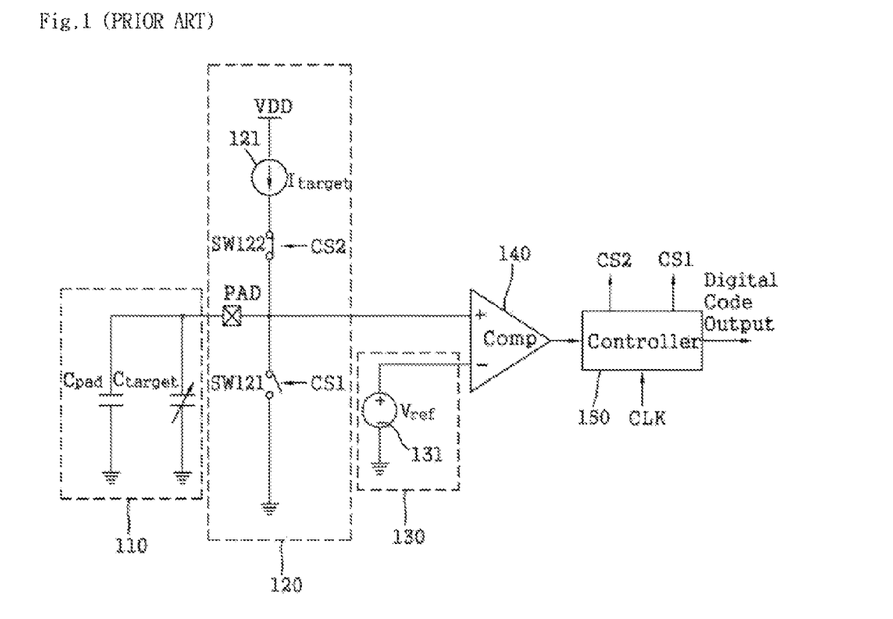
FIG. 1 is a circuit diagram illustrating a conventional circuit for measuring a capacitance value of a touch screen.

FIG. 1 is a circuit diagram illustrating a conventional circuit for measuring a capacitance value of a touch screen.

Referring to FIG. 1, the conventional circuit for measuring a capacitance value of a touch screen includes a target capacitor unit 110, a target voltage control unit 120, a reference voltage supply unit 130, a comparator 140, and a controller 150.

First, a target capacitor initialization switch SW121 is turned on by a first switching control signal CS1 outputted at a high level from the controller 150. As a consequence, charges charged in a target capacitor $C_{target}$ and a parasitic capacitor $C_{pad}$ arranged at a touched point are completely discharged, and thus, the target capacitor $C_{target}$ and the parasitic capacitor $C_{pad}$ are initialized.

The target capacitor $C_{target}$ is one of a plurality of touch lines which are arranged in one direction, for example, a vertical direction, on a touch screen panel, or one of a plurality of target capacitors which are arranged on the one touch line. Further, the parasitic capacitor $C_{pad}$ is a capacitor present in a pad PAD to which one terminal of the target capacitor $C_{target}$ is connected.

Thereafter, the target capacitor initialization switch SW121 is turned off by the first switching control signal CS1 outputted at a low level from the controller 150, and a target capacitor charging switch SW122 is turned on by a second switching control signal CS2 outputted at a high level from the controller 150. Accordingly, as the target capacitor $C_{target}$ and the parasitic capacitor $C_{pad}$ are charged by a target current source 121, a voltage of the pad PAD as a common connection point of the target capacitor $C_{target}$ and the parasitic capacitor $C_{pad}$ increases linearly with the lapse of time.

The comparator 140 compares the voltage of the pad PAD inputted through the non-inverting input terminal thereof and a reference voltage of a fixed level inputted through the inverting input terminal thereof, and outputs a transition signal at a moment when the voltage of the pad PAD becomes higher than the reference voltage $V_{ref}$. As a user touches or does not touch the target capacitor $C_{target}$, capacitance of the target capacitor $C_{target}$ changes, and due to this fact, the voltage inputted to the non-inverting input terminal of the comparator 140 through the pad PAD changes. Therefore, depending upon a capacitance value obtained as user touches or does not touch the target capacitor $C_{target}$ a time, at which the comparator 140 outputs the transition signal, varies.

The controller 150 receives the transition signal outputted from the comparator 140 in synchronization with a clock signal CLK, calculates a capacitance value based on a time elapsed from the time at which the target capacitor $C_{target}$ is initialized to the time at which the transition signal is received, and outputs a corresponding digital code. The controller 150 may include a digital counter or a TDC (time-to-digital converter).

Figure 2:
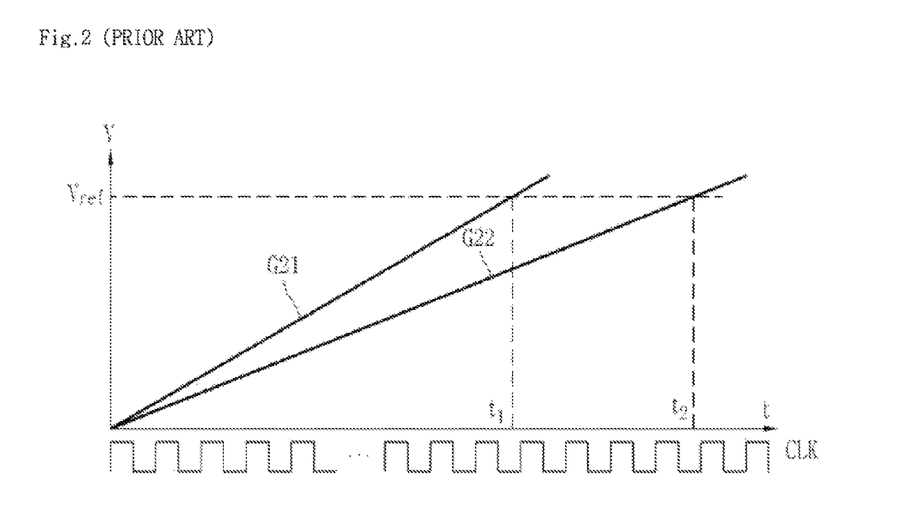
FIG. 2 is a graph showing a principle for measuring a capacitance value in the conventional circuit for measuring a capacitance value of a touch screen shown in FIG. 1.

FIG. 2 is a graph showing voltage changes in the pad PAD depending upon whether or not the target capacitor $C_{target}$ is touched. In FIG. 2, G21 is a graph showing a voltage change in the pad PAD when the target capacitor $C_{target}$ is not touched, and G22 is a graph showing a voltage change in the pad PAD when the target capacitor $C_{target}$ is touched.

When the target capacitor $C_{target}$ is touched by a user, capacitance changes. By this fact, as can be seen from the graph G22, the voltage slope of the pad PAD decreases, and a time for reaching the reference voltage $V_{ref}$ is lengthened. This is expressed as in the following Mathematic Equations 1.

[Mathematical Equations 1]

$$t_1 = \frac{C_{target} + C_{pad}}{I_{target}} V_{ref}$$

$$t_2 = \frac{C_{target} + C_{pad} + \Delta C}{I_{target}} V_{ref}$$

$$\Delta t = t_2 - t_1 = \frac{\Delta C}{I_{target}} V_{ref}$$

$$\therefore \Delta t = \frac{V_{ref}}{I_{target}} \Delta C,$$

$$\frac{\Delta t}{t_1} = \frac{\Delta C}{C_{target} + C_{pad}}$$

Here, $\Delta C$ is a capacitance variation in the target capacitor $C_{target}$ by the touch, and $\Delta t$ is a time t2−t1 additionally required to reach the reference voltage $V_{ref}$ due to the capacitance variation resulting from the touch.

A maximum conversion time $t_{conversion\_max}$ required to measure the capacitance variation of the target capacitor $C_{target}$ is expressed as in the following Mathematical Equation 2.

[Mathematical Equations 2]

$$t_{conversion\_max} = \left( \frac{V_{ref}}{I_{target}} (C_{target\_min} + C_{pad} + \Delta C_{max}) + t_{reset} + t_{digital} \right)$$

Here, $t_{reset}$ is a time required to initialize the target capacitor $C_{target}$ and the parasitic capacitor $C_{pad}$, $t_{digital}$ is a time elapsed from a time at which a voltage inputted to the non-inverting input terminal of the comparator 140 is increased over the reference voltage $V_{ref}$ to a time at which the digital code is outputted from the controller 150.

In the case where the controller 150 includes a digital counter, a frequency $f_{CLK}$ of the clock signal CLK required to attain a desired n-bit resolution is expressed as in the following Mathematical Equation 3.

[Mathematical Equations 3]

$$f_{clk} = \frac{2^n - 1}{\Delta t_{max}}, \Delta t_{max} = \frac{V_{ref}}{I_{target}} \Delta C_{max}$$

While $\Delta t_{max}$ should be increased to decrease the frequency $f_{CLK}$ of the clock signal CLK, it can be seen that $\Delta t_{max}$ has a direct trade-off relationship with the maximum conversion time $t_{conversion\_max}$. $\Delta t_{max}$ means a maximum time additionally required for the output voltage of the pad PAD to reach the reference voltage $V_{ref}$ as a capacitance variation becomes a maximum by the touch.

Accordingly, in the conventional circuit for measuring a capacitance value of a touch screen, difficulties exist in decreasing a frequency of a clock signal which is required to improve a resolution or attain a predetermined resolution. Due to this fact, the stable operation of the circuit cannot be ensured, and it is difficult to simplify the configuration of the circuit and reduce power consumption.

SUMMARY OF THE INVENTION

Accordingly, the present invention has been made in an effort to solve the problems occurring in the related art, and an object of the present invention is to provide a circuit and a method for measuring a capacitance value of a touch screen, which can obtain a large time variation in spite of a small change in capacitance when a touch is made on a touch screen so that a resolution can be improved under the same condition, and can decrease a frequency of a clock signal necessary for obtaining a predetermined resolution.

In order to achieve the above object, according to one aspect of the present invention, there is provided a circuit for measuring a capacitance value of a touch screen, including: a target capacitor unit having a target capacitor charged with a target charging voltage which increases from a ground voltage with a predetermined slope; a target voltage control unit configured to charge the target capacitor using a target current source; a reference capacitor unit having a reference capacitor charged with a charging reference voltage which increases from an initial reference voltage with a slope smaller than the target charging voltage; a reference voltage control unit configured to charge the reference capacitor using a reference current source and a reference voltage source; a comparator configured to compare the target charging voltage as an output of the target capacitor and the charging reference voltage as an output of the reference capacitor, and output a transition signal at a moment when the target charging voltage becomes higher than the charging reference voltage; and a controller configured to receive an output signal of the comparator and a clock signal and generate a digital output signal and a control signal, wherein a capacitance value of the target capacitor is measured using a time elapsed from a time when the target capacitor is initialized to the ground voltage to a time when the transition signal is outputted from the comparator.

In order to achieve the above object, according to another aspect of the present invention, there is provided a circuit for measuring a capacitance value of a touch screen, including: a target capacitor unit having a target capacitor charged with a target charging voltage which increases from a ground voltage with a first slope and discharged with a target discharging voltage which decreases with a second slope smaller than the first slope; a target voltage control unit configured to charge and discharge the target capacitor using a first target current source and a second target current source; a reference capacitor unit having a reference capacitor charged with a charging reference voltage which increases from an initial reference voltage with a slope smaller than the first slope and discharged with a discharging reference voltage which decreases with a slope smaller than the second slope; a reference voltage control unit configured to charge and discharge the reference capacitor using a first reference current source, a second reference current source and a reference voltage source; a comparator configured to compare the target charging voltage and the charging reference voltage and output a first transition signal at a moment when the target charging voltage becomes higher than the charging reference voltage, and compare the target discharging voltage and the discharging reference voltage and output a second transition signal at a moment when the target discharging voltage becomes lower than the discharging reference voltage; and a controller configured to receive an output signal of the comparator and a clock signal and generate a control signal for controlling the target voltage control unit and the reference voltage control unit, wherein a capacitance value of the target capacitor for n bits (n is a natural number equal to or greater than 2) is measured using a time elapsed from a time when the target capacitor is initialized to the ground voltage to a time when the first transition signal is outputted from the comparator and a time elapsed from a time when the target capacitor and the reference capacitor are discharged to a time when the second transition signal is outputted from the comparator.

In order to achieve the above object, according to another aspect of the present invention, there is provided a method for measuring a capacitance value of a touch screen, including: (a) a target capacitor and reference capacitor initializing step of initializing a target capacitor to a ground voltage and initializing a reference capacitor to an initial reference voltage; (b) a target capacitor and reference capacitor charging step of charging the target capacitor with a target charging voltage which increases with a predetermined slope and charging the reference capacitor with a charging reference voltage which increases with a slope smaller than the target charging voltage; (c) a transition signal outputting step of comparing the target charging voltage and the charging reference voltage and outputting a transition signal at a moment when the target charging voltage becomes higher than the charging reference voltage; and (d) a capacitance value measuring step of measuring a capacitance value of the target capacitor by calculating a time elapsed from a time when the target capacitor is initialized to a time when the transition signal is outputted.

In order to achieve the above object, according to another aspect of the present invention, there is provided a method for measuring a capacitance value of a touch screen, including: (a) a target capacitor and reference capacitor initializing step of initializing a target capacitor to a ground voltage and initializing a reference capacitor to an initial reference voltage; (b) a target capacitor and reference capacitor charging step of charging the target capacitor with a target charging voltage which increases with a first slope and charging the reference capacitor with a charging reference voltage which increase with a slope smaller than the first slope; (c) a first transition signal outputting step of comparing the target charging voltage and the charging reference voltage by a comparator and outputting a first transition signal at a moment when the target charging voltage becomes higher than the charging reference voltage; (d) a first capacitance value measuring step of measuring a capacitance value of the target capacitor by calculating a time elapsed from a time when the target capacitor is initialized to the ground voltage to a time when the first transition signal is outputted; (e) a target capacitor and reference capacitor discharging step of sensing by a controller that the first transition signal is outputted from the comparator, discharging the target capacitor with a target discharging voltage which decreases with a second slope smaller than the first slope, and discharging the reference capacitor with a discharging reference voltage which decreases with a slope smaller than the second slope; (f) a second transition signal outputting step of comparing the target discharging voltage and the discharging reference voltage through the comparator and outputting a second transition signal at a moment when the target discharging voltage becomes smaller than the discharging reference voltage; and (g) a second capacitance value measuring step of measuring a capacitance value of the target capacitor by calculating a time elapsed from a time when the target capacitor and the reference capacitor are discharged to a time when the second transition signal is outputted, wherein the capacitance value of the target capacitor is measured for n bits (n is a natural number equal to or greater than 2).

BRIEF DESCRIPTION OF THE DRAWINGS

The above objects, and other features and advantages of the present invention will become more apparent after a reading of the following detailed description taken in conjunction with the drawings, in which.

DETAILED DESCRIPTION OF PREFERRED EMBODIMENTS

Reference will now be made in greater detail to a preferred embodiment of the invention, an example of which is illustrated in the accompanying drawings. Wherever possible, the same reference numerals will be used throughout the drawings and the description to refer to the same or like parts.

Figure 3:
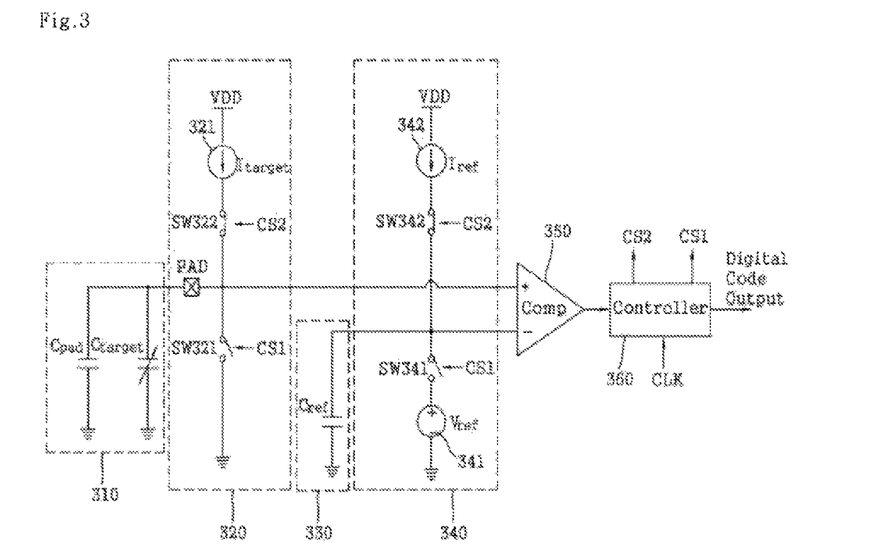
FIG. 3 is a circuit diagram illustrating a circuit for measuring a capacitance value of a touch screen in accordance with an embodiment of the present invention.
Figure 4:
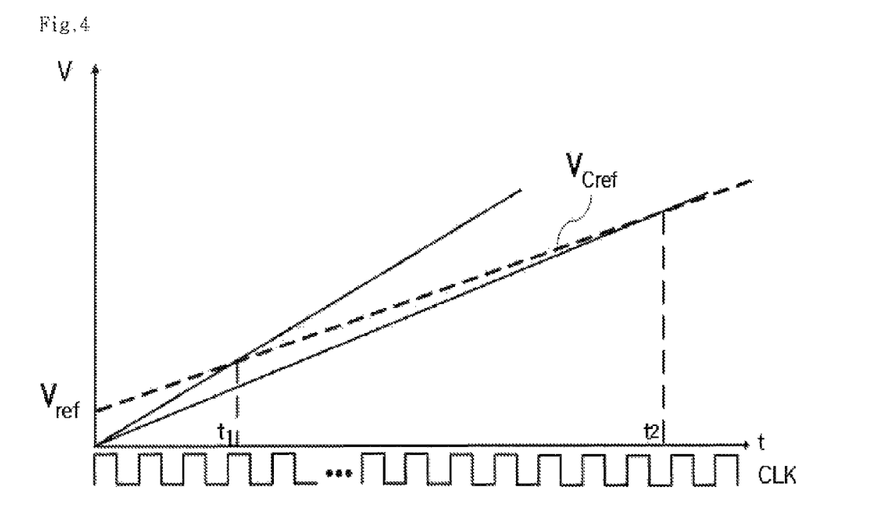
FIG. 4 is a graph showing a principle for measuring a capacitance value in the circuit for measuring a capacitance value of a touch screen in accordance with the embodiment of the present invention shown in FIG. 3.

FIG. 3 is a circuit diagram illustrating a circuit for measuring a capacitance value of a touch screen in accordance with an embodiment of the present invention, and FIG. 4 is a graph showing a principle for measuring a capacitance value in the circuit for measuring a capacitance value of a touch screen in accordance with the embodiment of the present invention shown in FIG. 3.

Referring to FIG. 3, a circuit for measuring a capacitance value of a touch screen in accordance with an embodiment of the present invention includes a target capacitor unit 310, a target voltage control unit 320, a reference capacitor unit 330, a reference voltage control unit 340, a comparator 350, and a controller 360.

The target capacitor unit 310 includes a target capacitor $C_{target}$ and a parasitic capacitor $C_{pad}$. The target capacitor $C_{target}$ has a first terminal which is grounded and a second terminal which is connected to the non-inverting terminal (+) of the comparator 350 through an output pad PAD. The parasitic capacitor $C_{pad}$ has a first terminal which is grounded and a second terminal which is connected in parallel to the second terminal of the target capacitor $C_{target}$, and is a capacitor present in the pad PAD. The target capacitor $C_{target}$ is initialized to a ground voltage and is then charged with a target charging voltage $V_{Ctarget}$ which increases with a predetermined slope.

The target voltage control unit 320 includes a target current source 321, a target capacitor initialization switch SW321, and a target capacitor charging switch SW322. The target current source 321, the target capacitor initialization switch SW321 and the target capacitor charging switch SW322 are connected in series between a power supply terminal VDD and a ground terminal. The target capacitor charging switch SW322 is controlled by a second switching control signal CS2, and the target capacitor initialization switch SW321 is controlled by a first switching control signal CS1. The common connection node of the target capacitor charging switch SW322 and the target capacitor initialization switch SW321 is connected with the pad PAD.

The reference capacitor unit 330 includes a reference capacitor $C_{ref}$ having a first terminal which is grounded and a second terminal which is connected to the inverting terminal of the comparator 350. The reference capacitor $C_{ref}$ is initialized to an initial reference voltage $V_{ref}$ and is charged with a charging reference voltage $V_{Cref}$ which increases with a slope smaller than the target charging voltage $V_{Ctarget}$.

The reference voltage control unit 340 includes a reference current source 342, a reference capacitor charging switch SW342, a reference capacitor initialization switch SW341, and a reference voltage source 341.

The reference current source 342 has a first terminal which is connected to the power supply terminal VDD and a second terminal which is connected to the second terminal of the reference capacitor $C_{ref}$ through the reference capacitor charging switch SW342, and charges the reference capacitor $C_{ref}$ with the charging reference voltage $V_{Cref}$.

The reference capacitor charging switch SW342 is controlled by the second switching control signal CS2 and supplies a reference current $I_{ref}$ of the reference current source 342 to the reference capacitor $C_{ref}$.

The reference voltage source 341 has a first terminal which is connected to the ground terminal and a second terminal which is connected to the second terminal of the reference capacitor $C_{ref}$ through the reference capacitor initialization switch SW341.

The reference capacitor initialization switch SW341 is controlled by the first switching control signal CS1 and charges the reference capacitor $C_{ref}$ with the initial reference voltage $V_{ref}$.

The comparator 350 has the non-inverting terminal to which the second terminal of the target capacitor $C_{target}$ is connected and the inverting terminal to which the second terminal of the reference capacitor $C_{ref}$ is connected. The comparator 350 compares the target charging voltage $V_{Ctarget}$ charged in the target capacitor $C_{target}$ and the charging reference voltage $V_{Cref}$ charged in the reference capacitor $C_{ref}$, and outputs a transition signal which transitions from a first level voltage to a second level voltage at a moment when the target charging voltage $V_{Ctarget}$ becomes higher than the charging reference voltage $V_{Cref}$.

The controller 360 receives the output signal of the comparator 350 and a clock signal CLK, and generates digital output signals, that is, the first switching control signal CS1 and the second switching control signal CS2.

Figure 5:
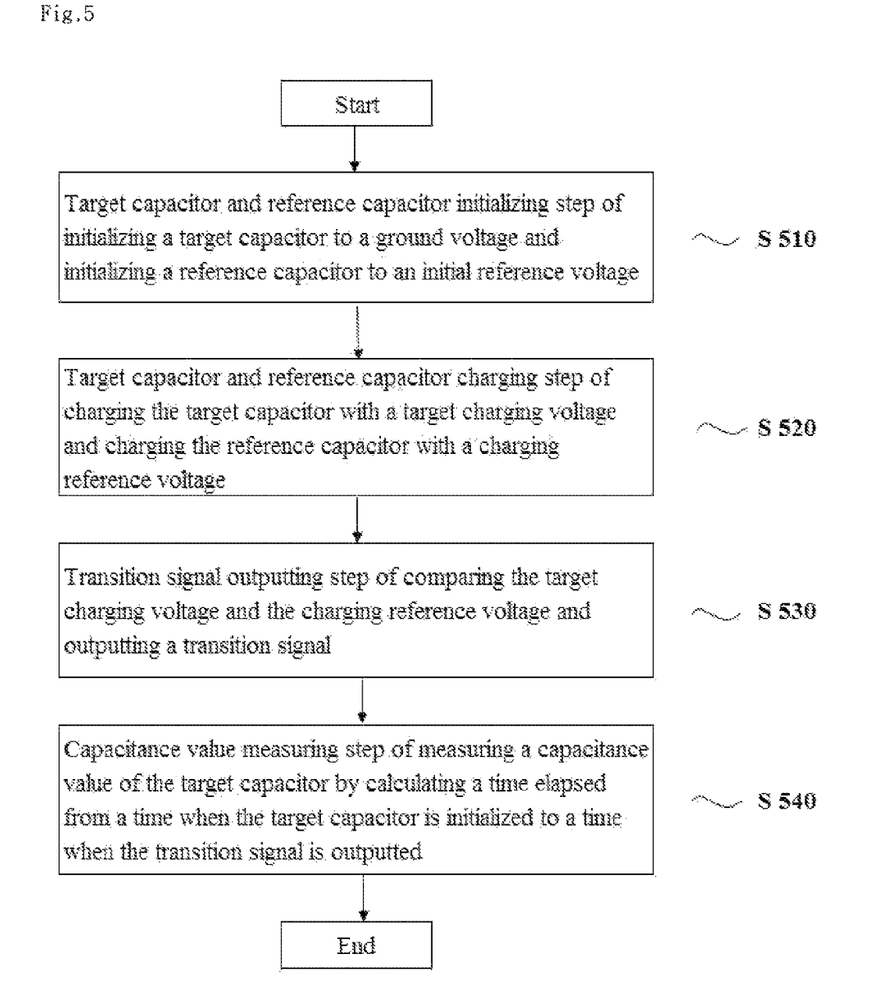
FIG. 5 is a flow chart showing a method for measuring a capacitance value of a touch screen in accordance with another embodiment of the present invention.

FIG. 5 is a flow chart showing a method for measuring a capacitance value of a touch screen in accordance with another embodiment of the present invention.

Hereafter, an operation principle of the capacitance value measuring circuit and a capacitance value measuring method in accordance with another embodiment of the present invention will be described with reference to FIGS. 3 through 5.

A method for measuring a capacitance value of a touch screen in accordance with another embodiment of the present invention includes a target capacitor and reference capacitor initializing step S510, a target capacitor and reference capacitor charging step S520, a transition signal outputting step S530, and a capacitance value measuring step S540.

In the target capacitor and reference capacitor initializing step S510, the target capacitor $C_{target}$ is initialized to the ground voltage and the reference capacitor $C_{ref}$ is initialized to the initial reference voltage $V_{ref}$.

While it is described herein that the target capacitor $C_{target}$ is initialized to the ground voltage, it is conceivable as a matter of course that the object of the present invention can be achieved even when the target capacitor $C_{target}$ is initialized to an optional voltage between the ground voltage and the initial reference voltage $V_{ref}$.

In the target capacitor and reference capacitor charging step S520, the target capacitor $C_{target}$ is charged with the target charging voltage $V_{Ctarget}$ which increases with the predetermined slope, and the reference capacitor $C_{ref}$ is charged with the charging reference voltage $V_{Cref}$ which increases with the slope smaller than the target charging voltage $V_{ref}$.

In the transition signal outputting step S530, the target charging voltage $V_{Ctarget}$ and the charging reference voltage $V_{Cref}$ are compared with each other, and the transition signal is outputted at a moment when the target charging voltage $V_{Ctarget}$ becomes higher than the charging reference voltage $V_{Cref}$.

In the capacitance value measuring step S540, a capacitance value of the target capacitor $C_{target}$ is measured by calculating a time elapsed from the initialization time of the target capacitor $C_{target}$ to the time at which the transition signal is outputted.

First, the first switching control signal CS1 having a first voltage level (for example, a high level) and the second switching control signal CS2 having a second voltage level (for example, a low level) are generated from the controller 360.

At this time, the target capacitor initialization switch SW321 and the reference capacitor initialization switch SW341 are turned on by the first switching control signal CS1, and the target capacitor charging switch SW322 and the reference capacitor charging switch SW342 are turned off by the second switching control signal CS2.

According to this fact, in the target capacitor and reference capacitor initializing step S510, the target capacitor $C_{target}$ is initialized to the ground voltage, and the reference capacitor $C_{ref}$ is initialized to the initial reference voltage $V_{ref}$.

While it was exemplified in the above descriptions that the controller 360 initializes the target capacitor $C_{target}$ by outputting the first switching control signal CS1 to a high level and initializes the reference capacitor $C_{ref}$ to the initial reference voltage $V_{ref}$ of the reference voltage source 341 by outputting the second switching control signal CS2 to a low level, a person skilled in the art will readily appreciate that the present invention is not limited to such.

The first switching control signal CS1 and the second switching control signal CS2 are complementary signals which do not overlap with each other. At this time, while the capacitors $C_{target}$, $C_{pad}$ and $C_{ref}$ are initialized by an RC time constant, it is preferred that the turn-on resistance values of the target capacitor initialization switch SW321 and the reference capacitor initialization switch SW341 be designed to be sufficiently small in order to shorten an initialization time.

Then, the controller 360 generates the first switching control signal CS1 having a second voltage level (a low level) and the second switching control signal CS2 having a first voltage level (a high level).

At this time, the target capacitor initialization switch SW321 and the reference capacitor initialization switch SW341 are turned off by the first switching control signal CS1, and the target capacitor charging switch SW322 and the reference capacitor charging switch SW342 are turned on by the second switching control signal CS2.

According to this fact, in the target capacitor and reference capacitor charging step S520, the target capacitor $C_{target}$ and the parasitic capacitor $C_{pad}$ are charged with the target charging voltage $V_{Ctarget}$ by the target current source 321, and the voltages of the target capacitor $C_{target}$ and the parasitic capacitor $C_{pad}$ linearly increase. Also, the reference capacitor $C_{ref}$ is charged with the reference current $I_{ref}$ which is supplied from the reference current source 342.

At this time, the slope of the target charging voltage $V_{Ctarget}$ charged in the target capacitor $C_{target}$ becomes larger than the slope of the charging reference voltage $V_{Cref}$ charged in the reference capacitor $C_{ref}$.

Next, in the transition signal outputting step S530, the target charging voltage $V_{Ctarget}$ and the charging reference voltage $V_{Cref}$ are compared through the comparator 350, and the comparator 350 outputs the transition signal at a moment when the target charging voltage $V_{Ctarget}$ becomes higher than the charging reference voltage $V_{Cref}$.

That is to say, the comparator 350 receives the target charging voltage $V_{Ctarget}$ which linearly increases in the target capacitor $C_{target}$ and the parasitic capacitor $C_{pad}$, via the pad PAD through the non-inverting input terminal (+) thereof and receives the charging reference voltage $V_{Cref}$ which linearly increases in the reference capacitor $C_{ref}$ through the inverting input terminal (−) thereof, and outputs the transition signal which transitions from the first level voltage to the second level voltage, at a moment when the voltage inputted through the non-inverting input terminal becomes higher than the voltage inputted through the inverting input terminal.

In another embodiment, a configuration, in which the inverting input terminal and the non-inverting input terminal of the comparator 350 are changed with each other, may be contemplated. Also, not by supplying the charging reference voltage $V_{Cref}$ to the inverting input terminal of the comparator 350 using a separate reference voltage source as described above but by appropriately adjusting the size of a MOS transistor connected to the inverting input terminal of the comparator 350, the same effect as supplying the charging reference voltage $V_{Cref}$ may be achieved.

In this way, since the charging reference voltage $V_{Cref}$ supplied to the inverting input terminal of the comparator 350 linearly increases, a time Δt (=t2−t1) between a time t1 (see FIG. 4), at which the transition signal is outputted from the comparator 350 with the target capacitor $C_{target}$ not touched by a user and a time t2 (see FIG. 4), at which the transition signal is outputted from the comparator 350 with the target capacitor $C_{target}$ touched by the user, becomes significantly long compared to FIG. 2.

The comparator 350 may be realized by a discrete time comparator which performs discretely the comparison operation or a continuous time comparator which performs continuously the comparison operation.

In FIG. 4, G41 is a graph showing a voltage change in the pad PAD when the target capacitor $C_{target}$ is not touched, and G42 is a graph showing a voltage change in the pad PAD when the target capacitor $C_{target}$ is touched.

As can be seen from the above descriptions, in the case where the target capacitor $C_{target}$ is touched by the user, capacitance of the target capacitor $C_{target}$ changes. By this fact, as shown by the graph G42 in FIG. 4, a voltage slope of the pad PAD decreases, and it takes a longer time to reach the charging reference voltage $V_{Cref}$. This can be expressed as in the following Mathematical Equations 4.

As described above, because the time difference Δt between the times t1 and t2 becomes significantly long when compared to the conventional art, a frequency of a clock signal necessary for detecting a touch to a touch screen with an n-bit resolution can be decreased or a resolution can be improved to a predetermined frequency of a clock signal, without trade-off with a maximum conversion time $t_{conversion\_max}$.

[Mathematical Equations 4]

$$t_1 = \frac{V_{ref}}{\frac{I_{target}}{C_{target} + C_{pad}} - \frac{I_{ref}}{C_{ref}}}, \quad t_2 = \frac{V_{ref}}{\frac{I_{target}}{C_{target} + C_{pad} + \Delta C} - \frac{I_{ref}}{C_{ref}}}$$

$$\Delta t = t_2 - t_1 = V_{ref}\left(\frac{\alpha(1-k)}{(\alpha - \beta)(\alpha k - \beta)}\right)$$

$$\alpha = \frac{I_{target}}{C_{target} + C_{pad}}, \quad \beta = \frac{I_{ref}}{C_{ref}}, \quad k = \frac{C_{target} + C_{pad}}{C_{target} + C_{pad} + \Delta C}$$

$$\therefore \frac{\Delta t}{t_1} = \frac{1-k}{k - \frac{\beta}{\alpha}} = \frac{\frac{\Delta C}{C_{target} + C_{pad} + \Delta C}}{\frac{C_{target} + C_{pad}}{C_{target} + C_{pad} + \Delta C} - \frac{I_{ref}}{I_{target}} \frac{C_{target} + C_{pad}}{C_{ref}}}$$

Here, α should be greater than β.

From the Mathematical Equations 4, it can be seen that, if α is greater than β, a time variation always increases when compared to a conventional circuit for measuring a capacitance value. While Δt and ΔC do not have a linear relationship, because Δt increases monotonically as ΔC increases, no problem results.

Accordingly, the maximum conversion time $t_{conversion\_max}$ in the circuit for measuring a capacitance value of a touch screen can be expressed as in the following Mathematical Equation 5.

[Mathematical Equations 5]

$$t_{conversion\_max} = \left(\frac{V_{max}}{I_{target}}(C_{target\_min} + C_{pad} + \Delta C_{max}) + t_{reset} + t_{digital}\right)$$

Here, $V_{max}$ a value that is determined by capacitance of current sources is a voltage which is inputted to the non-inverting input terminal of the comparator 350 when capacitance becomes a maximum. It is preferred that this voltage be selected as an appropriate value in consideration of the voltage of the power supply terminal VDD and the margins of the current sources.

When comparing the Mathematical Equation 5 with the Mathematical Equation 2 according to the conventional capacitance value measuring circuit, if $V_{max}$ becomes equal to $V_{ref}$, the maximum conversion time $t_{conversion\_max}$ is not lengthened, and Δt is lengthened. Therefore, a resolution for a touch sensing signal can be improved or a frequency of a necessary clock signal can be decreased.

At this time, in order to minimize an influence of charge injection by the reference capacitor charging switch SW342, it is preferred that a capacitance value of the reference capacitor $C_{ref}$ be set as an average capacitance value of the target capacitor $C_{target}$ and the parasitic capacitor $C_{pad}$.

Further, it is preferred that capacitance values of the target current source 321 and the reference current source 342, a magnitude of the initial reference voltage $V_{ref}$, and a frequency $f_{CLK}$ of the clock signal CLK provided to the controller 360 be appropriately set in combined consideration of the voltage of the power supply terminal VDD, the maximum conversion time $t_{conversion\_max}$ and a desired resolution. The capacitance values of the target current source 321 and the reference current source 342 and the initial reference voltage $V_{ref}$ are expressed as in the following Mathematical Equations 6.

[Mathematical Equations 6]

$$I_{target} = V_{max}(C_{pad} + C_{target\_min} + \Delta C_{max})\frac{1}{t_{charging\_max}}$$

$$t_{charging\_max} = (t_{conversion\_max} - t_{reset} - t_{digital})$$

$$\therefore \Delta t_{max} = \frac{(2^n - 1)}{f_{clk}}$$

$$\frac{I_{ref}}{C_{ref}} = \frac{V_{max} - \frac{I_{target}}{C_{pad} + C_{target\_min}}(t_{charging\_max} - \Delta t_{max})}{\Delta t_{max}}$$

$$V_{ref} = V_{max} - \frac{I_{ref}}{C_{ref}} t_{charging\_max}$$

Here, $\Delta t_{max}$ determined by the desired resolution and the frequency $f_{CLK}$ of the usable clock signal CLK should be shorter than a maximum charging time $t_{charging\_max}$ required for charging. If $\Delta t_{max}$ is set to be substantially equal to the maximum charging time $t_{charging\_max}$ in order to use the clock signal CLK with a lower frequency, difficulties exist in that the initial reference voltage $V_{ref}$ of the reference voltage source 341 and the precisions of the target current source 321 and the reference current source 342 should be increased. Therefore, it is preferred that $\Delta t_{max}$ be set to an appropriate value.

Nevertheless, even in this case, the same resolution may be obtained by using a clock signal with a significantly low frequency when compared to the conventional art. Of course, in an application field requiring a very fast conversion speed, the maximum conversion time $t_{conversion\_max}$ is shortened, and a clock signal with a high frequency is needed.

In the capacitance value measuring step S540, a capacitance value of the target capacitor $C_{target}$ is measured by calculating a time elapsed from the initialization time of the target capacitor $C_{target}$ to the time at which the transition signal is outputted.

At this time, the controller 360 receives the output signal of the comparator 350 each time when the controller 360 is triggered by the clock signal CLK. In the case where the controller 360 receives a transition signal (for example, a high level signal), the controller 360 calculates a capacitance value based on a time elapsed from a time at which the target capacitor $C_{target}$ is initialized to a time at which the transition signal is outputted, and outputs digital codes.

To this end, the controller 360 may include a digital counter or a TDC (time-to-digital converter).

This process for measuring a capacitance value is for one touch line on a touch screen panel or one coordinate among a plurality of target capacitors arranged on the one touch line, and a capacitance value for another coordinate may be detected through the above-described process.

Meanwhile, the controller 360 verifies whether or not the transition signal is outputted every time when the controller 360 is triggered by the clock signal CLK, and, with no touch made, detects the first transition time t1 at which the target charging voltage $V_{Ctarget}$ becomes higher than the charging reference voltage $V_{Cref}$ through the target capacitor and reference capacitor initializing step S510 through the transition signal outputting step S530.

Also, with a touch made, the controller 360 detects the second transition time t2 at which the target charging voltage $V_{Ctarget}$ becomes higher than the charging reference voltage $V_{Cref}$, through the target capacitor and reference capacitor initializing step S510 through the transition signal outputting step S530.

In succession, the controller 360 measures a variation in capacitance value using the difference between the first transition time t1 and the second transition time t2, and can thereby recognize whether a touch to a touch screen panel is made or not.

Figure 6:
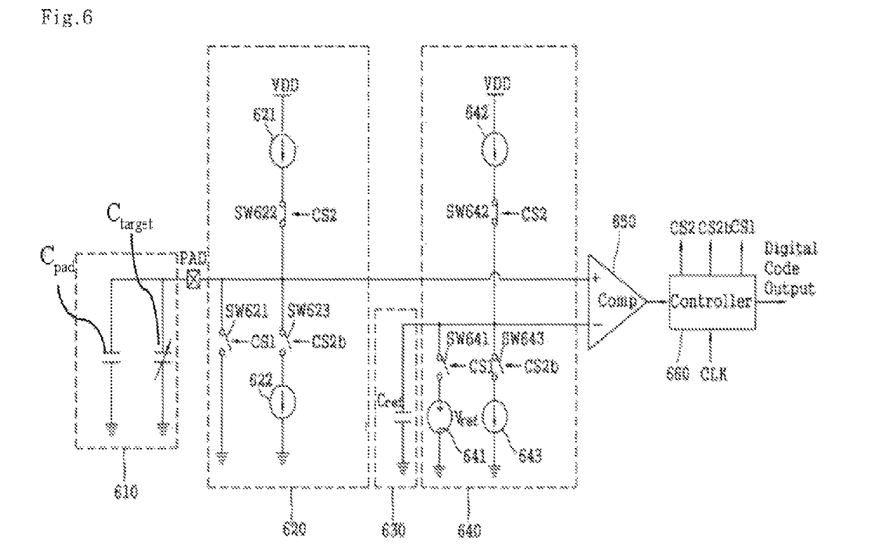
FIG. 6 is a circuit diagram illustrating a circuit for measuring a capacitance value of a touch screen in accordance with another embodiment of the present invention.
Figure 7:
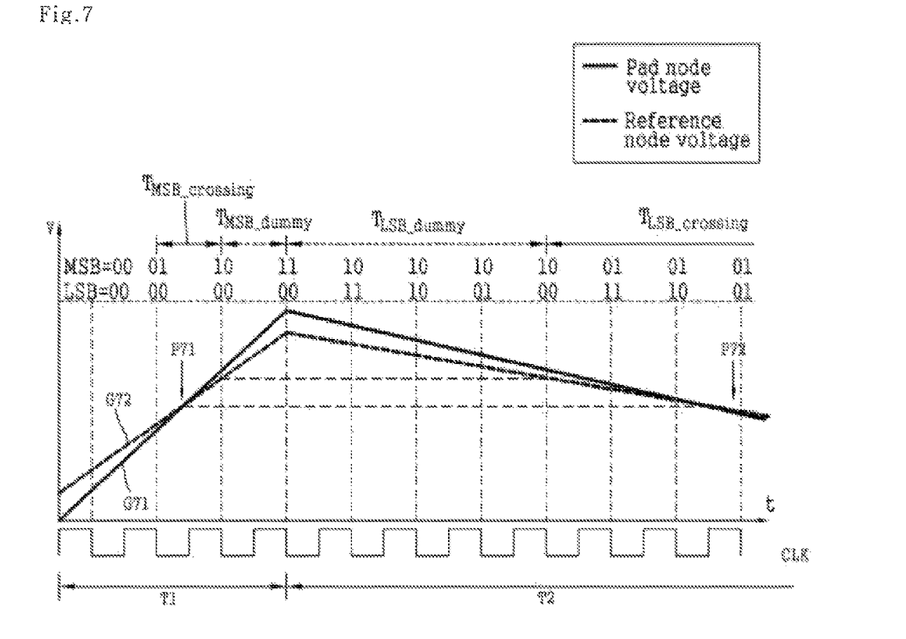
FIG. 7 is a graph showing a principle for measuring a capacitance value in the circuit for measuring a capacitance value of a touch screen in accordance with another embodiment of the present invention shown in FIG. 6.

FIG. 6 is a circuit diagram illustrating a circuit for measuring a capacitance value of a touch screen in accordance with another embodiment of the present invention, and FIG. 7 is a graph showing a principle for measuring a capacitance value in the circuit for measuring a capacitance value of a touch screen in accordance with another embodiment of the present invention shown in FIG. 6.

Referring to FIG. 6, a circuit for measuring a capacitance value of a touch screen in accordance with another embodiment of the present invention relates to a circuit for measuring a capacitance value of a touch screen which adopts subranging, and includes a target capacitor unit 610, a target voltage control unit 620, a reference capacitor unit 630, a reference voltage control unit 640, a comparator 650, and a controller 660.

The target capacitor unit 610 includes a target capacitor $C_{target}$ and a parasitic capacitor $C_{pad}$. The target capacitor $C_{target}$ has a first terminal which is grounded and a second terminal which is connected to the non-inverting terminal (+) of the comparator 650 through an output pad PAD. The parasitic capacitor $C_{pad}$ has a first terminal which is grounded and a second terminal which is connected in parallel to the second terminal of the target capacitor $C_{target}$, and is a capacitor present in the pad PAD. The target capacitor $C_{target}$ is charged with a target charging voltage $V_{Ctarget}$ which increases from a ground voltage with a predetermined slope, and is discharged with a target discharging voltage $V_{Ctarget}$ which decreases with a preselected slope.

The target voltage control unit 620 includes a first target current source 621, a target capacitor initialization switch SW621, a target capacitor charging switch SW622, a target capacitor discharging switch SW623 and a second target current source 622, and functions to charge and discharge the target capacitor $C_{target}$. The first target current source 621, the target capacitor initialization switch SW621, the target capacitor charging switch SW622, the target capacitor discharging switch SW623 and the second target current source 622 are connected in series between a power supply terminal VDD and a ground terminal.

The target capacitor initialization switch SW621 is controlled by a first switching control signal CS1, the target capacitor charging switch SW622 is controlled by a second switching control signal CS2, and the target capacitor discharging switch SW623 is controlled by an inverted second switching control signal CS2b.

The common connection node of the target capacitor charging switch SW622 and the target capacitor initialization switch SW621 is connected with the pad PAD.

The reference capacitor unit 630 includes a reference capacitor $C_{ref}$ having a first terminal which is grounded and a second terminal which is connected to the inverting terminal of the comparator 650. The reference capacitor $C_{ref}$ is charged with a charging reference voltage $V_{Cref}$ which increases from an initial reference voltage $V_{ref}$ with a slope smaller than the target charging voltage $V_{Ctarget}$, and is then discharged with a discharging reference voltage $V_{Dref}$ which decreases with a slope smaller than the target discharging voltage $V_{Dtarget}$.

The reference voltage control unit 640 includes a reference voltage source 641, a first reference current source 642, a second reference current source 643, a reference capacitor initialization switch SW641, a reference capacitor charging switch SW642 and a reference capacitor discharging switch SW643, and functions to charge and discharge the reference capacitor $C_{ref}$.

The comparator 650 has the non-inverting terminal to which the second terminal of the target capacitor $C_{target}$ is connected, the inverting terminal to which the second terminal of the reference capacitor $C_{ref}$ is connected, and an output terminal which is connected to the input terminal of the controller 660.

The comparator 650 compares the target charging voltage $V_{Ctarget}$ charged to the target capacitor $C_{target}$ and the charging reference voltage $V_{Cref}$ charged to the reference capacitor $C_{ref}$ and outputs a first transition signal at a moment when the target charging voltage $V_{Ctarget}$ becomes higher than the charging reference voltage $V_{Cref}$, and compares the target discharging voltage $V_{Dtarget}$ and the discharging reference voltage $V_{Dref}$ and outputs a second transition signal at a moment when the target discharging voltage $V_{Dtarget}$ becomes lower than the discharging reference voltage $V_{Dref}$.

The controller 660 receives the output signal of the comparator 650 and a clock signal CLK and generates digital output signals, that is, the first switching control signal CS1, the second switching control signal CS2, and the inverted second switching control signal CS2b.

Also, the controller 660 measures a capacitance value of the target capacitor $C_{target}$ for n bits (n is a natural number equal to or greater than 2) by using a time elapsed from a time at which the target capacitor $C_{target}$ is initialized to the ground voltage to a time (P71) at which the first transition signal is outputted from the comparator 650 or a time (P72) at which the second transition signal is outputted from the comparator 650.

Figure 8:
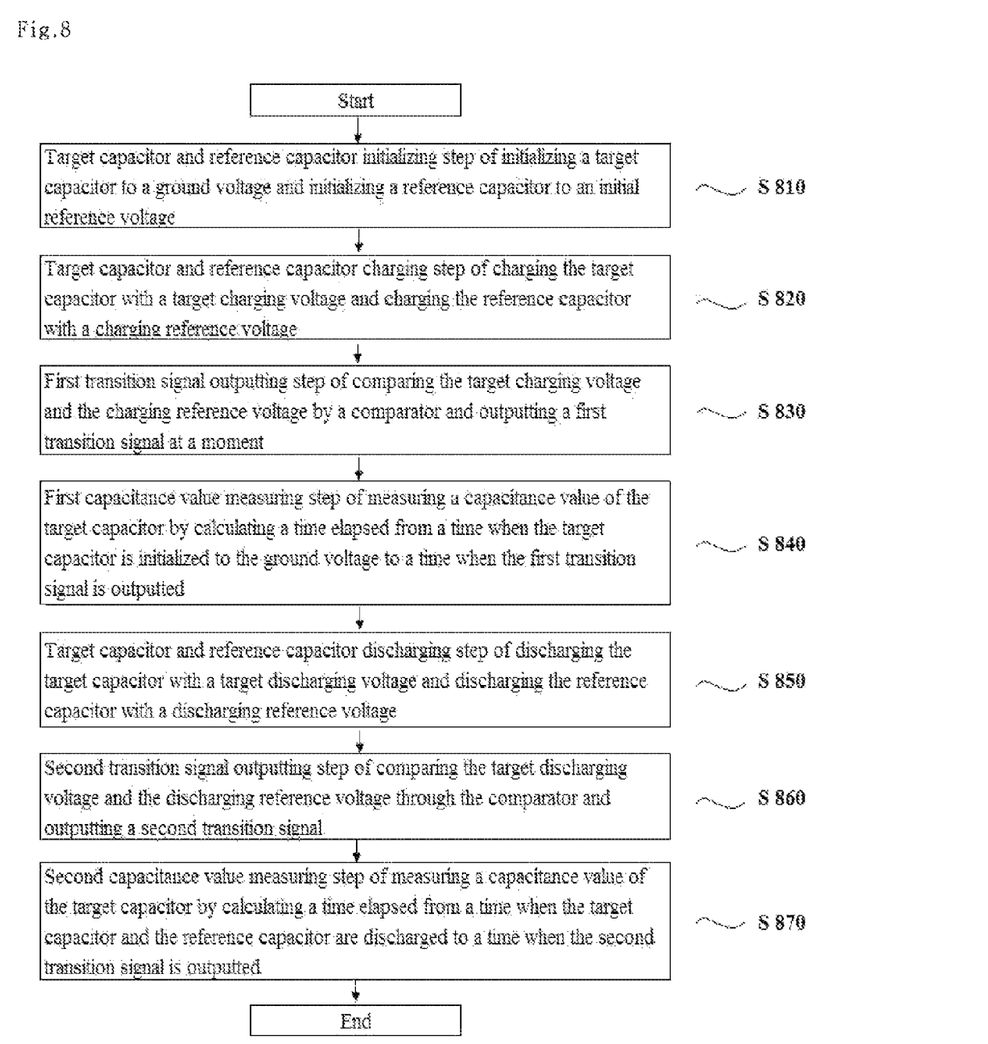
FIG. 8 is a flow chart showing a method for measuring a capacitance value of a touch screen in accordance with another embodiment of the present invention.

FIG. 8 is a flow chart showing a method for measuring a capacitance value of a touch screen in accordance with another embodiment of the present invention.

Hereafter, an operation principle of the circuit for measuring a capacitance value of a touch screen and a capacitance value measuring method in accordance with another embodiment of the present invention will be described with reference to FIGS. 6 through 8.

A method for measuring a capacitance value of a touch screen in accordance with another embodiment of the present invention includes a target capacitor and reference capacitor initializing step S810, a target capacitor and reference capacitor charging step S820, a first transition signal outputting step S830, a first capacitance value measuring step S840, a target capacitor and reference capacitor discharging step S850, a second transition signal outputting step S860, and a second capacitance value measuring step S870.

In the target capacitor and reference capacitor initializing step S810, the target capacitor $C_{target}$ is initialized to the ground voltage, and the reference capacitor $C_{ref}$ is initialized to the initial reference voltage $V_{ref}$.

In the target capacitor and reference capacitor charging step S820, the target capacitor $C_{target}$ is charged with the target charging voltage $V_{Ctarget}$ which increases with the predetermined slope, and the reference capacitor $C_{ref}$ is charged with the charging reference voltage $V_{Cref}$ which increases with the slope smaller than the target charging voltage $V_{Ctarget}$.

In the first transition signal outputting step S830, the comparator 650 compares the target charging voltage $V_{Ctarget}$ and the charging reference voltage $V_{Cref}$, and outputs the first transition signal at the moment when the target charging voltage $V_{Ctarget}$ becomes higher than the charging reference voltage $V_{Cref}$.

In the first capacitance value measuring step S840, a capacitance value of the target capacitor $C_{target}$ for upper bits (MSB) is measured by calculating a time elapsed from a time when the target capacitor $C_{target}$ is initialized to the ground voltage to a time when the first transition signal is outputted.

In the target capacitor and reference capacitor discharging step S850, by sensing through the controller 660 that the first transition signal is outputted from the comparator 650, the target capacitor $C_{target}$ is discharged with the target discharging voltage $V_{Dtarget}$ which decreases with a predetermined slope, and the reference capacitor $C_{ref}$ is discharged with the discharging reference voltage $V_{Dref}$ which decreases with a slope smaller than the target discharging voltage $V_{Dtarget}$.

In the second transition signal outputting step S860, the comparator 650 compares the target discharging voltage $V_{Dtarget}$ and the discharging reference voltage $V_{Dref}$ and outputs the second transition signal at the moment when the target discharging voltage $V_{Dtarget}$ becomes lower than the discharging reference voltage $V_{Dref}$.

In the second capacitance value measuring step S870, a capacitance value of the target capacitor $C_{target}$ for lower bits (LSB) is measured by calculating a time elapsed from the discharge time of the target capacitor $C_{target}$ and the reference capacitor $C_{ref}$ to a time when the second transition signal is outputted.

In the method for measuring a capacitance value of a touch screen in accordance with another embodiment of the present invention, the capacitance value of the upper bits (MSB) in the capacitance value of the target capacitor $C_{target}$ to measure is measured at a high speed in a coarse detect period, and the capacitance value of the remaining lower bits (LSB) in the capacitance value of the target capacitor $C_{target}$ is measured at a low speed in a fine detect period.

Here, upper bits (MSB) mean bits of an upper part and lower bits (LSB) means bits of a lower part when the entire bits of a capacitance value are divided into two parts.

The controller 660 outputs the first switching control signal CS1 to a first voltage level (a high level) and turns on the target capacitor initialization switch SW621 and the reference capacitor initialization switch SW641, and outputs the second switching control signal CS2 at a second voltage level (a low level) and turns off the target capacitor charging switch SW622 and the reference capacitor charging switch SW642.

According to this fact, the voltages of the target capacitor $C_{target}$ and the parasitic capacitor $C_{pad}$ of the target capacitor unit 610 are completely discharged to the ground voltage through the target capacitor initialization switch SW621, and the reference capacitor $C_{ref}$ is initialized to the initial reference voltage $V_{ref}$ (S810).

The first switching control signal CS1 and the second switching control signal CS2 are complementary signals which do not overlap with each other. At this time, while the capacitors $C_{target}$, $C_{pad}$ and $C_{ref}$ are initialized by an RC time constant, it is preferred that the turn-on resistance values of the target capacitor initialization switch SW621 and the reference capacitor initialization switch SW641 be designed to be sufficiently small in order to shorten an initialization time.

Then, the controller 660 generates the first switching control signal CS1 with a second voltage level (a low level) and the second switching control signal CS2 with a first voltage level (a high level).

At this time, the target capacitor initialization switch SW621 and the reference capacitor initialization switch SW641 are turned off by the first switching control signal CS1, and the target capacitor charging switch SW622 and the reference capacitor charging switch SW642 are turned on by the second switching control signal CS2 (S820).

According to this fact, in the target capacitor and reference capacitor charging step S820, the target capacitor $C_{target}$ and the parasitic capacitor $C_{pad}$ are charged with the target charging voltage $V_{Ctarget}$ by the first target current source 621, and the voltages of the target capacitor $C_{target}$ and the parasitic capacitor $C_{pad}$ linearly increase. Also, the reference capacitor $C_{ref}$ is charged with the charging reference voltage $V_{Cref}$ by a first reference current $I_{ref}$ which is supplied from the first reference current source 642.

At this time, the target charging voltage $V_{Ctarget}$ and the charging reference voltage $V_{Cref}$ have relatively high slopes.

The comparator 650 receives the target charging voltage $V_{Ctarget}$ which linearly increases in the target capacitor $C_{target}$ and the parasitic capacitor $C_{pad}$, via the pad PAD through the non-inverting input terminal thereof, and receives the charging reference voltage $V_{Cref}$ which linearly increases in the reference capacitor $C_{ref}$, through the inverting input terminal thereof.

The comparator 650 compares the target charging voltage $V_{Ctarget}$ and the charging reference voltage $V_{Cref}$, and outputs the first transition signal at a moment when they cross with each other, for example, when the voltage inputted through the non-inverting input terminal becomes higher than the voltage inputted through the inverting input terminal (S830).

Therefore, unlike the conventional art in which a reference voltage with a fixed level is inputted to the inverting input terminal of a comparator, in the method for measuring a capacitance value of a touch screen in accordance with the embodiment of the present invention, the voltage supplied to the inverting input terminal of the comparator 650 is initialized to the initial reference voltage $V_{ref}$ and then linearly increases.

Meanwhile, the controller 660 checks whether the first transition signal is outputted from the comparator 650, each time when the controller 660 is triggered by the clock signal CLK. In the case where the controller 660 is triggered by the falling edge of the clock signal CLK and $\Delta t_{max}$ is divided by a period corresponding to a desired resolution (for example, 255 periods when n=8 bits), whether or not the first transition signal is outputted from the comparator 650 is checked by the unit of an MSB (upper n/2 bits) each time when the controller 660 is triggered.

When it is determined as a result of the checking that the first transition signal is outputted from the comparator 650, the controller 660 calculates a capacitance value of upper bits in a capacitance value of the target capacitor $C_{target}$, based on a time elapsed from a time when the target capacitor $C_{target}$ is initialized to the transition time (P71), and outputs digital codes (S840).

Next, a process for measuring a capacitance value of lower bits (LSB) in a capacitance value of the target capacitor $C_{target}$ to measure, at a low speed in a fine detect period will be described.

The controller 660 outputs the second switching control signal CS2 at a low level and thereby turns off the target capacitor charging switch SW622 and the reference capacitor charging switch SW642. Also, the controller 660 turns on the target capacitor discharging switch SW623 and the reference capacitor discharging switch SW643 by the inverted second switching control signal CS2b.

Accordingly, the target charging voltage $V_{Ctarget}$ of the target capacitor $C_{target}$ and the parasitic capacitor $C_{pad}$ is discharged through the target capacitor discharging switch SW623 and the second target current source 622, and the charging reference voltage $V_{Cref}$ of the reference capacitor $C_{ref}$ is discharged through the reference capacitor discharging switch SW643 and the second reference current source 643. The current of the second target current source 622 corresponds to $1/2^{(n/2)}$ times a target current $I_{target}$ of the first target current source 621, that is, $I_{target}/2^{n/2}$, and the current of the second reference current source 643 corresponds to $1/2^{n/2}$ times the reference current $I_{ref}$ of the first reference current source 642, that is, $I_{ref}/(2^{(n/2)})$.

According to this fact, the target charging voltage $V_{Ctarget}$ of the target capacitor $C_{target}$ and the parasitic capacitor $C_{pad}$ and the charging reference voltage $V_{Cref}$ of the reference capacitor $C_{ref}$ are discharged with a slow slope of $1/2^{n/2}$ (S850).

By doing this, the same effect as increasing the period of the upper bits (MSB) by $2^{n/2}$ times is obtained, and due to this fact, the controller 660 can measure a capacitance value of the target capacitor $C_{target}$ by the unit of the lower bits (LSB) using the clock signal CLK of the same frequency.

Meanwhile, in the period of the lower bits (LSB), a transition signal is outputted once more from the comparator 650. In respond to this, the controller 660 performs again the above-described steps. That is to say, the controller 660 calculates a capacitance value of the lower bits in the capacitance value of the target capacitor $C_{target}$, and outputs digital codes.

This process for measuring a capacitance value is for one touch line or a target capacitor on the one touch line, and a process for measuring a capacitance value for another touch line may be performed as in the above-described process.

FIG. 7 is a graph showing a capacitance value measuring principle adopting subranging described above with reference to FIG. 6. Here, it will be explained that measuring of a capacitance value will be performed by exemplifying 4 bits. Among 4 bits, upper 2 bits will be referred to as an MSB and lower 2 bits will be referred to as an LSB. Further, it is assumed that the slope of the output voltage of the pad PAD is set to be relatively high as shown in the graph G71 and correspondingly the slope of the charging reference voltage $V_{Cref}$ outputted from the reference capacitor $C_{ref}$ after being initialized to the initial reference voltage $V_{ref}$ is set as shown in the graph G72.

In this case, in a coarse detect period T1 in which the target charging voltage $V_{Ctarget}$ of the target capacitor $C_{target}$ and the parasitic capacitor $C_{pad}$ increases quickly by the first target current source 621, the controller 660 checks whether or not a transition signal is outputted from the comparator 650, by the unit of the MSB each time when the controller 660 is triggered by the falling edge of the clock signal CLK. Here, a time when a transition signal is outputted from the comparator 650 corresponds to a time when the output voltage of the pad PAD corresponds to (crosses with) the charging reference voltage.

In the present example, since the first transition signal is outputted from the comparator 650 at the time P71 between the MSB 01 and 10, the controller 660 can confirm the occurrence of transition when the MSB becomes 10 (an entire bit value: 1000).

Due to this fact, after a preparation time for interrupting a charging operation during an upper bit dummy period $T_{MSB\_dummy}$ is elapsed, the controller 660 interrupts the charging operation to the target capacitor $C_{target}$ by the first target current source 621. Here, the upper bit dummy period $T_{MSB\_dummy}$ corresponds to 1 MSB value.

Then, a fine detect period T2 is entered. During this period, the target charging voltage $V_{Ctarget}$ of the target capacitor $C_{target}$ and the parasitic capacitor $C_{pad}$ and the charging reference voltage $V_{Cref}$ of the reference capacitor $C_{ref}$ are discharged with a slow slope of $1/2^{n/2}$ (a slope corresponding to $1/4$ of the slope upon charging) as described above.

Even at this time, after a lower bit dummy period $T_{LSB\_dummy}$ corresponding to a 4 LSB value is elapsed to compensate for the upper bit dummy period $T_{MSB\_dummy}$ described above, the controller 660 checks whether or not the second transition signal is outputted from the comparator 650, by the unit of the LSB each time when the controller 660 is triggered by the falling edge of the clock signal CLK.

In the present example, since the second transition signal is outputted from the comparator 650 in the period P71 between entire bit values 0110 and 0101, the controller 660 can confirm the occurrence of transition when the entire bit value becomes 0101.

As a result, the controller 660 does not check the output signal of the comparator 650 by the unit of lower bits (LSB) from the beginning but checks the output signal of the comparator 650 by the unit of 1 bit of the upper bits (MSB) corresponding to 4 bits of the lower bits (LSB). If it is determined that a transition signal is outputted, the controller 660 checks again from that time whether or not a transition signal is outputted by the unit of 1 bit of the lower bits (LSB) for one touch made.

By doing this, whether or not a transition signal is outputted from the comparator 650 can be reliably detected quickly even by using a relatively low frequency, and a resultant effect becomes more apparent as a resolution increases.

For example, in the case where a resolution is 8 bits, even when using a frequency of a clock signal that is 51.2 times lower than when the present invention is not applied, it is possible to detect at the same speed whether or not a transition signal is outputted from the comparator 650.

In another example, in the case where a resolution is 12 bits, even when using a frequency of a clock signal that is 208 times lower than when the present invention is not applied, it is possible to detect at the same speed whether or not a transition signal is outputted from the comparator 650.

At this time, it can be easily proved mathematically that a most rapid conversion speed can be obtained when $(n+1)/2$ and $(n-1)/2$ bits are respectively assigned upon charging and discharging if a bit number n is an odd and when $n/2$ bits are assigned upon each of charging and discharging if a bit number n is an even.

In this case, as a discharge time is added, a maximum conversion time $t_{conversion\_max}$ is expressed as in the following Mathematical Equation 7.

$$t_{conversion\_max} = (t_{charging\_max} + t_{discharging\_max} + t_{reset} + t_{digital})$$

[Mathematical Equation 7]

Here, a maximum discharging time $t_{discharging\_max}$ is about 2 times a maximum charging time $t_{charging\_max}$.

Accordingly, the target current $I_{target}$ supplied from the first target current source 621 and the initial reference voltage $V_{ref}$ supplied from the reference voltage source 641 are expressed as in the following Mathematical Equations 8.

[Mathematical Equations 8]

$$I_{target} = V_{max}(C_{pad} + C_{target\_min} + \Delta C_{max})\frac{1}{t_{charging\_max}}$$

$$\frac{I_{ref}}{C_{ref}} = \frac{V_{max} - \frac{I_{target}}{C_{pad} + C_{target\_min}}(t_{charging\_max} - \Delta t_{max})}{\Delta t_{max}}$$

$$V_{ref} = V_{max} - \frac{I_{ref}}{C_{ref}}t_{charging\_max}$$

The following Mathematical Equations 9 are equations for calculating a frequency of a clock signal needed for satisfying a given condition, wherein $F_{clk\_conventional}$ represents a frequency calculating equation according to the conventional art, $F_{clk\_proposed\_1}$ represents a frequency calculating equation according to the first embodiment of the present invention, and $F_{clk\_proposed\_2}$ represents a frequency calculating equation according to the second embodiment of the present invention adopting subranging. Further, the following Mathematical Equations 10 represent conditions of the Mathematical Equations 9.

[Mathematical Equations 9]

$$\therefore f_{clk\_conventional} = 2^n \frac{C_{target\_min} + \Delta C_{max} + C_{pad}}{\Delta C_{max}} \frac{1}{t_{conversion\_max}}$$

-continued $$\therefore f_{clk\_proposed\_1} = (2^n + d_1)\frac{1}{t_{conversion\_max}}$$

$$\therefore f_{clk\_proposed\_2} = (2.5 \times 2^{n/2} + 1 + d_2)\frac{1}{t_{conversion\_max}}$$

[Mathematical Equations 10]

$C_{pad} + C_{target\_min} = 100$ pF, $\Delta C_{max} = 10$ pF, $t_{conversion\_max} = 5$ μs, $V_{max} = 0.8$ V, $V_{ref} = 30$ mV $\therefore d_1 = 10/40$ $(n = 8/12)$ $\therefore d_2 = 6/24$ $(n = 8/12)$ A most significant difference between the equation for calculating a frequency of a clock signal according to the conventional art and the equations for calculating a frequency of a clock signal according to the present invention, needed to satisfy the conditions given in the Mathematical Equation 10, resides in that the target capacitor $C_{target}$ and the parasitic capacitor $C_{pad}$ are not involved any more in determining the frequency of a clock signal and the frequency of a clock signal is determined only by d (the number of clock signals elapsed until the voltage charged in the target capacitor $C_{target}$ when a touch is not made and the charging reference voltage $V_{Cref}$ meet with each other) as a design variable. Also, in a frequency $f_{clk\_proposed\_2}$ in the second embodiment of the present invention adopting subranging, as a resolution n increases, not an exponential increase according to n of a frequency but an exponential increase according to n/2 of a frequency is exhibited. Therefore, as a resolution increases, a gain increases when compared to the conventional art. The Mathematical Equation 10 represents an example of exemplifying a condition and selecting an appropriate d according to the condition.

As is apparent from the above description, the circuit and the method for measuring a capacitance value of a touch screen according to the present invention provides advantages in that a resolution is improved by linearly changing a reference voltage of a comparator when measuring a capacitance value and a frequency of a necessary clock signal can be decreased by using subranging, whereby the stable operation of a circuit can be ensured and power consumption can be reduced.

Also, the configuration of a circuit for measuring a capacitance value of a touch screen is simplified so that an installation space can be reduced.

Although a preferred embodiment of the present invention has been described for illustrative purposes, those skilled in the art will appreciate that various modifications, additions and substitutions are possible, without departing from the scope and the spirit of the invention as disclosed in the accompanying claims.

What is claimed is:

1. A circuit for measuring a capacitance value of a touch screen, comprising:
   a target capacitor unit having a target capacitor charged with a target charging voltage which increases from a ground voltage with a predetermined slope;
   a target voltage control unit configured to charge the target capacitor using a target current source;
   a reference capacitor unit having a reference capacitor charged with a charging reference voltage which increases from an initial reference voltage with a slope smaller than the target charging voltage;

a reference voltage control unit configured to charge the reference capacitor using a reference current source and a reference voltage source;

a comparator configured to compare the target charging voltage as an output of the target capacitor and the charging reference voltage as an output of the reference capacitor, and output a transition signal at a moment when the target charging voltage becomes higher than the charging reference voltage; and a controller configured to receive an output signal of the comparator and a clock signal, and generate a digital output signal and a control signal, wherein a capacitance value of the target capacitor is measured using a time elapsed from a time when the target capacitor is initialized to the ground voltage to a time when the transition signal is outputted from the comparator, wherein the reference capacitor is connected to an input terminal of the comparator, wherein the reference voltage source is configured to charge the reference capacitor with the initial reference voltage, and wherein the reference current source is configured to charge the reference capacitor with the charging reference voltage after the reference capacitor has been charged with the initial reference voltage.

2. The circuit according to claim 1, wherein the reference capacitor has a first terminal which is grounded and a second terminal which is connected to an inverting input terminal of the comparator.

3. The circuit according to claim 1, wherein the reference voltage control unit comprises:

the reference voltage source configured to charge the reference capacitor with the initial reference voltage; and the reference current source configured to supply a reference current to the reference capacitor in order to charge the reference capacitor with the charging reference voltage.

4. The circuit according to claim 3, wherein the reference voltage source has a first terminal which is grounded and a second terminal which is connected to the second terminal of the reference capacitor through a reference capacitor initialization switch, and wherein the reference current source has a first terminal which is connected to a power supply voltage and a second terminal which is connected to the second terminal of the reference capacitor through a reference capacitor charging switch.

5. The circuit according to claim 1, wherein the comparator has a non-inverting input terminal which receives the target charging voltage and an inverting input terminal which receives the charging reference voltage, and wherein the comparator outputs the transition signal which transitions from a first level voltage to a second level voltage at a moment when the target charging voltage becomes higher than the charging reference voltage.

6. A circuit for measuring a capacitance value of a touch screen, comprising:

a target capacitor unit having a target capacitor charged with a target charging voltage which increases from a ground voltage with a first slope and discharged with a target discharging voltage which decreases with a second slope smaller than the first slope;

a target voltage control unit configured to charge and discharge the target capacitor using a first target current source and a second target current source;

a reference capacitor unit having a reference capacitor charged with a charging reference voltage which increases from an initial reference voltage with a slope smaller than the first slope and discharged with a discharging reference voltage which decreases with a slope smaller than the second slope;

a reference voltage control unit configured to charge and discharge the reference capacitor using a first reference current source, a second reference current source, and a reference voltage source;

a comparator configured to compare the target charging voltage and the charging reference voltage and output a first transition signal at a moment when the target charging voltage becomes higher than the charging reference voltage, and compare the target discharging voltage and the discharging reference voltage and output a second transition signal at a moment when the target discharging voltage becomes lower than the discharging reference voltage; and a controller configured to receive an output signal of the comparator and a clock signal, and generate a control signal for controlling the target voltage control unit and the reference voltage control unit, wherein a capacitance value of the target capacitor for n bits (n is a natural number equal to or greater than 2) is measured using a time elapsed from a time when the target capacitor is initialized to the ground voltage to a time when the first transition signal is outputted from the comparator and a time elapsed from a time when the target capacitor and the reference capacitor are discharged to a time when the second transition signal is outputted from the comparator.

7. The circuit according to claim 6, wherein the reference capacitor has a first terminal which is grounded and a second terminal which is connected to an inverting input terminal of the comparator.

8. The circuit according to claim 6, wherein the reference voltage control unit comprises:

the first reference current source configured to supply a first reference current to the reference capacitor and charge the reference capacitor with the charging reference voltage;

the second reference current source configured to supply a second reference current to the reference capacitor and discharge the reference capacitor with the discharging reference voltage; and the reference voltage source configured to charge the reference capacitor with the initial reference voltage.

9. The circuit according to claim 8, wherein the first reference current source has a first terminal which is connected to a power supply voltage and a second terminal which is connected to the second terminal of the reference capacitor through a reference capacitor charging switch, wherein the second reference current source has a first terminal which is grounded and a second terminal which is connected to the second terminal of the reference capacitor through a reference capacitor discharging switch, and wherein the reference voltage source has a first terminal which is grounded and a second terminal which is connected to the second terminal of the reference capacitor through a reference capacitor initialization switch.

10. The circuit according to claim 8,
wherein the second reference current is $\frac{1}{2}^{(n/2)}$ times the first reference current, and
wherein a second target current supplied by the second target current source is $\frac{1}{2}^{(n/2)}$ times a first target current supplied by the first target current source.

11. A method performed by a circuit for measuring a capacitance value of a touch screen, wherein the circuit comprises a target capacitor, a reference capacitor, a comparator, a reference voltage source, and a reference current source, the method comprising:
(a) a target capacitor and reference capacitor initializing step of initializing the target capacitor to a ground voltage, and initializing, by the reference voltage source, the reference capacitor to an initial reference voltage;
(b) a target capacitor and reference capacitor charging step of charging the target capacitor with a target charging voltage which increases with a predetermined slope, and charging, by the reference current source, the reference capacitor with a charging reference voltage which increases with a slope smaller than the target charging voltage;
(c) a transition signal outputting step of comparing, by the comparator, the target charging voltage and the charging reference voltage, and outputting a transition signal at a moment when the target charging voltage becomes higher than the charging reference voltage; and
(d) a capacitance value measuring step of measuring a capacitance value of the target capacitor by calculating a time elapsed from a time when the target capacitor is initialized to a time when the transition signal is outputted,
wherein the reference capacitor is connected to an input terminal of the comparator, and
wherein the charging, by the reference current source, the reference capacitor with the charging reference voltage occurs after the initializing, by the reference voltage source, the reference capacitor to the initial reference voltage.

12. The method according to claim 11, wherein, in the step (d), a transition time is detected by checking whether or not the transition signal is outputted every time when being triggered by a clock signal, and the capacitance value of the target capacitor is measured using the time elapsed from the time when the target capacitor is initialized to the ground voltage to the time when the transition signal is outputted.

13. The method according to claim 11, wherein, in the step (d), whether or not the transition signal is outputted is checked every time when being triggered by the clock signal, a first transition time at which the target charging voltage becomes higher than the charging reference voltage is detected through the steps (a) through (c) in a state in which no touch is made, a second transition time at which the target charging voltage becomes higher than the charging reference voltage is detected through the steps (a) through (c) in a state in which a touch is made, and whether or not a touch is made is determined by measuring a capacitance variation of the target capacitor using a time difference between the first transition time and the second transition time.

14. A method for measuring a capacitance value of a touch screen, comprising:
(a) a target capacitor and reference capacitor initializing step of initializing a target capacitor to a ground voltage, and initializing a reference capacitor to an initial reference voltage;
(b) a target capacitor and reference capacitor charging step of charging the target capacitor with a target charging voltage which increases with a first slope, and charging the reference capacitor with a charging reference voltage which increases with a slope smaller than the first slope;
(c) a first transition signal outputting step of comparing the target charging voltage and the charging reference voltage by a comparator, and outputting a first transition signal at a moment when the target charging voltage becomes higher than the charging reference voltage;
(d) a first capacitance value measuring step of measuring a capacitance value of the target capacitor by calculating a time elapsed from a time when the target capacitor is initialized to the ground voltage to a time when the first transition signal is outputted;
(e) a target capacitor and reference capacitor discharging step of sensing by a controller that the first transition signal is outputted from the comparator, discharging the target capacitor with a target discharging voltage which decreases with a second slope smaller than the first slope, and discharging the reference capacitor with a discharging reference voltage which decreases with a slope smaller than the second slope;
(f) a second transition signal outputting step of comparing the target discharging voltage and the discharging reference voltage through the comparator, and outputting a second transition signal at a moment when the target discharging voltage becomes smaller than the discharging reference voltage; and
(g) a second capacitance value measuring step of measuring a capacitance value of the target capacitor by calculating a time elapsed from a time when the target capacitor and the reference capacitor are discharged to a time when the second transition signal is outputted,
wherein the capacitance value of the target capacitor is measured for n bits (n is a natural number equal to or greater than 2).

15. The method according to claim 14, wherein the step (d) is a step of measuring a capacitance value of upper bits (MSB) which mean bits of an upper region in the capacitance value of the target capacitor.

16. The method according to claim 15, wherein the step (g) is a step of measuring a capacitance value of lower bits (LSB) which mean bits of a lower region in the capacitance value of the target capacitor.

17. The method according to claim 14, wherein the slope of the target discharging voltage and the slope of the discharging reference voltage correspond to $\frac{1}{2}^{(n/2)}$ times the slope of the target charging voltage and the charging reference voltage, respectively.

* * * * *